July 25, 1933. J. C. HORNUNG 1,919,330
TEMPERATURE REGULATION SYSTEM
Filed April 8, 1932
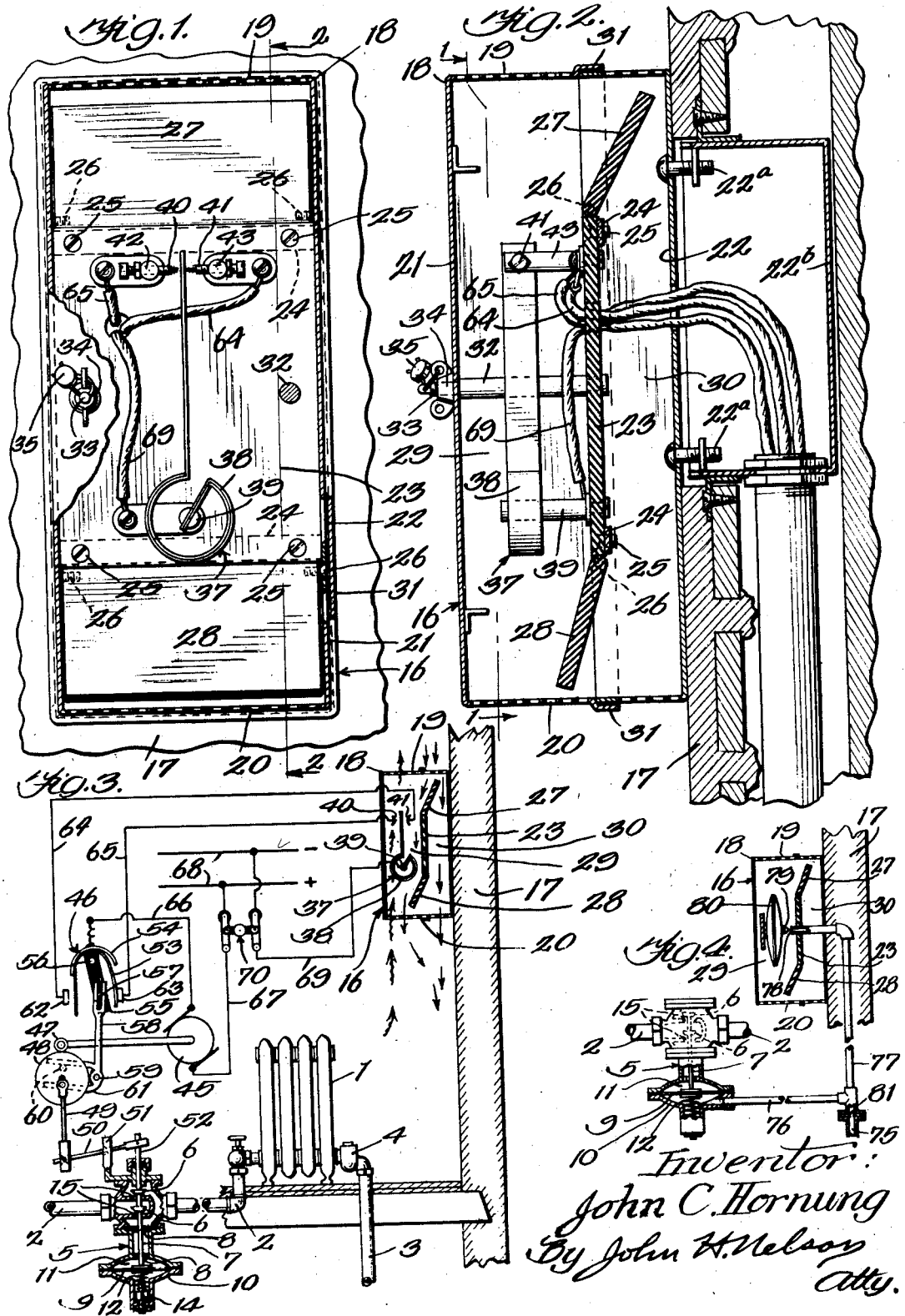
Inventor:
John C. Hornung
By John H. Nelson
Atty.

Patented July 25, 1933

1,919,330

UNITED STATES PATENT OFFICE

JOHN C. HORNUNG, OF GLENCOE, ILLINOIS

TEMPERATURE REGULATION SYSTEM

Application filed April 8, 1932. Serial No. 603,941.

This invention relates to a temperature regulation system and apparatus employed for dwellings and the like.

The invention has for its primary object the provision of means whereby dwellings or zones thereof may be maintained at a predetermined comfortable temperature automatically regardless of exterior temperature changes.

That portion of a room or dwelling close to an exterior wall will be first affected by exterior temperature changes due to thermal infiltration through the wall, so that in the event the exterior temperature suddenly drops considerably, a cold air current is caused to flow downward along the wall in opposition to the warm air current caused by the heat radiating means in the room. The temperature of this cold air current, and the time interval between its existence and the drop in exterior temperature is dependent upon the thermal resistance of the wall. Therefore, it is an object of the invention to provide means which is responsive to said air current conditions for regulating the heating system in accordance with the exterior temperature changes and the thermal resistance of the wall whereby the room temperature is maintained accordingly.

The invention includes a room temperature regulator comprising thermo-responsive means in controlling connections with a heating system and means whereby said opposing air currents are proportioned in accordance with the thermal resistance of the wall and directed into responsive relation with the thermo-responsive means so that said means will respond to a predetermined mean temperature of the proportioned air currents.

Other objects and advantages will become apparent by reference to the specification and the accompanying drawing, in which:

Fig. 1 is a front sectional view of the room temperature regulator of the system, showing its application to a room wall, parts being in full and parts broken away, the view being taken substantially on the line 1—1 of Fig. 2.

Fig. 2 is a sectional view of Fig. 1 taken on the line 2—2.

Fig. 3 is a diagrammatic illustration of one embodiment of the temperature regulation system.

Fig. 4 is a diagrammatic illustration of a modified form of the invention.

The heating system shown in carrying out the invention is that of the type where the heating medium employed is steam, although any type of heat transfer medium of a like nature could be employed. The system includes the room radiator 1 connected with a steam supply pipe 2 and with a return pipe 3 through which the condensed steam passes back to the boiler (not shown) which is controlled by the usual thermostatic valve 4.

In the steam supply pipe 2 is means for controlling the flow of the steam such as a pressure regulator valve structure 5 of a common type for regulating the pressure under which steam will flow to the radiator. Said regulator includes the valves 6 mounted on the valve stem 7 which is slidable in bearings 8. The bottom of the valve stem is secured to a pressure responsive diaphragm 9 which centrally divides the enlarged chambered end portion 10 of the valve structure. The chamber portion 11 above the diaphragm is in constant steam pressure communication with the radiator and a compression spring 12 is interposed between the bottom of the diaphragm and an adjustable nut 14 so that when the steam pressure overcomes the resistance of the spring, the positions of the valves 6 with respect to the valve openings 15 will be regulated and the pressure in the radiator accordingly controlled.

A room temperature regulator is employed for controlling the heating system in accordance with wall temperature changes caused by exterior temperature changes, and wind conditions.

Diagrammatically illustrated in Fig. 3 in controlling connection with the heating system and separately and more completely shown in Figs. 1 and 2, is a room temperature regulator 16 for controlling the system in accordance with temperature changes of the room wall 17 caused by exterior temperature changes. Said controller includes an elongated box like housing 18 mounted upon the wall in a vertical position. The housing has perforated end walls 19 and 20, thus being open to permit the passage of air therethrough.

The housing is longitudinally divided into halves, namely the cover 21 and the base portion 22 which is placed against the room wall and is secured by means of screws 22$^a$ to the electric wire outlet box 22$^b$ mounted in the wall. Centrally disposed and longitudinally extending within the housing is a partition, being secured to cross pieces 24 in the base portion by means of screws 25. Pivotally mounted at the ends of the partition by means of screws 26 in the side walls of the base, are dampers 27 and 28 of non-heat conducting material for controlling the flow of air currents along the room wall through the housing. Said dampers and partition thus form a common wall separating the housing into outer and inner compartments 29 and 30 respectively.

To prevent unauthorized adjustment of the dampers and other mechanism in the housing, the cover 21 is provided with an extended edge portion 31 which overlaps the edge of the base, thus covering the heads of the screws 26 which hold the dampers in adjusted positions. Extending from the partition are posts 32, each having a reduced threaded end 33 which passes through the cover and on which is threaded a wing nut 34. The ends 33 and the wing nuts are apertured to receive the wire seal 35, whereby the cover is locked to the base.

Disposed within the outer compartment 29 of the housing is a thermo-actuated switch 37 for controlling the operation of the pressure regulator valve, through the intermediation of electrical apparatus (later described) so as to regulate the flow of steam in accordance with air current conditions along the room wall surface caused in the event of exterior temperature changes and as directed and proportioned by the dampers through the compartment 29 of the housing. The dampers are to be adjusted in accordance with the thermal infiltration from the wall or in other words, in accordance with the thermal resistance of the wall. For instance, in the event of a sudden drop in exterior temperature in comparison with that of the room or a change in wind conditions, a cold air current will be caused to flow downward along the room wall surface (as shown by straight arrows in Fig. 3) and the temperature of this cold air current and its commencement will be dependent on the thermal resistance of the wall, so that if the room wall offers little resistance to exterior temperatures, then more heat is required in the room, and the greater its resistance the less heat is required. Therefore if the room wall offers little resistance to exterior temperature or the wind conditions, the top damper is adjusted to admit more of the cold air current into the compartment 29 and the bottom damper is adjusted to admit into said compartment a small amount of the warm air current flowing upward along the wall caused by the radiator, (as indicated by wavy arrows in Fig. 3) whereupon the thermo-actuated switch will respond to a mean temperature between the opposing said air currents that is in accordance with the thermal resistance of the wall, whereby the flow of steam is regulated accordingly and a predetermined room temperature maintained.

The thermo-actuated switch and its operable connection to the pressure regulator valve will now be described. Said switch comprises a thermo-responsive element 38 in the form of a bimetallic strip anchored at the bottom of the partition 23 on the electric terminal post 39. The strip encircles said post and continues upward between two spaced electric terminals 40 and 41, being in the form of adjustable screws which are respectively threaded into terminal posts 42 and 43.

In general, when the thermo-responsive element contacts with either terminal 40 or 41, an electric circuit is closed in a motor 45, depending upon the position of a switch 45, whereupon the motor in turn either closes 46 or opens the valves 6 through the intermediation of reduction gearing and levers, and upon the completion of the opening or closing of the valves, the circuit is opened by the switch 46 which is controlled by the motor.

The motor operates the valves 6 through the intermediation of a pinion 47 on the motor shaft and which meshes with a gear 48. Eccentrically pivoted on the gear is a pitman 49 which is pivotally connected to one held under tension by and secured centrally fulcrumed to a bracket 51 on the valve structure. The other end of the rocker arm is pivoted to a pin 52 which projects through the valve structure into contact with the valve stem 7 so that the motor positively closes the valves, but only permits the opening thereof which is dependent upon the pressure in the radiator. Either terminal 40 or 41 is always in circuit connection with one side of the motor through the switch 46. Said switch comprises a U shaped spring 53 held under tension by and secured centrally to a rigid curved base 54. Said base is mounted on a lever 55 of insulation which is pivoted at 56. The lever 55 has a pin 57 received within the forked end of an arm 58 pivoted at 59. The gear 48 has an eccentric pin 60 received within the forked extension 61 of the arm, so that at every half turn of the gear 48 in opening or closing the valves, the arm rocks the switch into contact with either terminal 62 or 63 which are respectively connected to the thermo-actuated switch terminals 41 and 40 through wires 64 and 65. One side of the motor is connected by wire 66 to the switch 46, the other side being connected by the conductor 67 to one of the electric power lines 68 and the other power line being connected by the conductor 69 to the terminal 39 of the thermo-responsive element 38. A double pole service 70 is provided for the conductors 67 and 69.

Assuming that the temperature in the compartment 29 is increasing, the thermo-responsive element 38 is adapted to contact with the terminal 40 after a predetermined temperature is reached, depending on the adjustment of the terminal 40, whereby the motor circuit is closed and the closing of the valves 6 effected, thus shutting off the steam. As previously described, after the valves are closed, the motor circuit is opened by the switch 46 which again establishes connection from the motor to the thermo-actuated switch terminal 41, preparatory to opening the valves at a predetermined decrease in temperature.

In general, Fig. 4 illustrates diagrammatically a modified form of the invention, with parts like parts previously described being designated by like numerals. In this form the pressure regulator valve 5 is controlled by temperature actuated means through the intermediation of vacuum so that the flow of steam will be regulated in proportion to temperature changes in the compartment 29 of the housing 18. The portion of the chamber 10 below the diaphragm 9 of the pressure regulator valve, is in communication with a vacuum conduit 75 through a branch pipe 76, said conduit being adapted to connect with a source of constant vacuum, not shown. Communicating with said conduit and the pipe 76 is a vent pipe 77 which terminates in the compartment 29 of the housing. Controlling the small vent opening 78 at the end of the pipe 77 is a valve 79 which projects from the side of a thermo-responsive element 80 which is in the form of a hollow diaphragm containing a volatile liquid. In the vacuum conduit 75 is an orifice 81, the area of which is a little less than that of the vent pipe opening 78 so that a constant vacuum will be maintained in the conduit from the source of vacuum up to the orifice. Assuming that the thermo-responsive element 80 is responding to increasing temperature in the compartment 29, the valve 79 gradually reduces the area of the vent pipe opening, causing a gradually increasing vacuum in the chamber below the diaphragm 9. In responding to increasing vacuum, the diaphragm 9 causes the valves 6 to accordingly decrease the flow of steam in direct proportion to temperature changes in the compartment 29, and thus in accordance with temperature changes of the room wall.

By virtue of the structures described, including the preferred and modified forms, a temperature regulation system is provided that maintains the temperature of the room in accordance with the resistance of its wall to exterior temperature changes, or the heat capacity of the wall.

Many alterations or modifications may be made, or substitutions made for certain elements disclosed without departing from the spirit of the invention. For instance, there are many forms of, heating medium, valves therefor, heat radiating means, thermo-actuated elements and other ways of operably connecting the thermo-responsive element to the heating medium valve than the two forms disclosed.

Having thus described my invention, I claim:

1. The combination with a heating system having means for controlling the flow of a fluid heating medium, of a room temperature regulator for controlling said system in accordance with wall temperature changes caused by exterior temperature changes, said regulator including a thermo-responsive element in controlling connection with said means, a housing comprising two side by side open ended compartments, one of which is adapted to extend along the wall surface and within one of which is disposed the thermo-responsive element, and damper means for proportioning and directing the circulation through said compartments of air currents of differing temperatures along the wall surface caused by said temperature changes so that said element responds to a predetermined mean temperature of the proportioned air currents.

2. The combination with a heating system having means for controlling the flow of a fluid heating medium, of a room temperature regulator for controlling said system in accordance with wall temperature changes caused by exterior temperature changes, said regulator including a thermo-responsive element in controlling connection with said means, a housing comprising two side by side open ended compartments one of which is adapted to extend along the wall and within the other is disposed the thermo-responsive element, an adjustable damper at each end of the housing and forming at least a portion of a common wall separating said compartments at various adjustments for proportioning and directing the circulation through said compartments of air currents of differing temperatures along the wall surface caused by said temperature changes so that said element responds to a predetermined mean temperature of the proportioned air currents.

3. In a temperature regulator device for heating systems, comprising a housing including two side by side open ended compartments, thermo-actuated means disposed in one of said compartments and adjustable dampers forming end portions of a common wall separating said compartments at various adjustments for controlling the open ends of the compartments.

4. In a temperature regulator device for heating systems, comprising a housing including two side by side open ended compartments, thermo-actuated means disposed in one of said compartments, a partition of non-heat-conducting material forming the central portion of a common wall separating said compartments and a damper of non-heat-conducting material pivotally mounted at each end of the partition, each being adjustable for regulating the open ends of the compartments.

5. In a temperature regulator device for heating systems, comprising a housing including two side by side open ended compartments, thermo-actuated means disposed in one of said compartments, a partition of non-heat-conducting material forming at least a portion of a common wall separating said compartments, and adjustable dampers for said compartments and for cooperating with said partition.

6. The structure as defined in claim 1 wherein a partition of non-heat-conducting material forms at least a portion of a common wall separating said compartments for preventing thermic interaction therebetween.

7. The structure as defined in claim 2 wherein a partition forms the central portion of a common wall separating said compartments, wherein said dampers are pivotally mounted at the ends of said partition and forming at various adjustments the end portions of the wall and said partition and dampers being of a non-heat-conducting material for preventing thermic interaction between said compartments.

8. In a device of the class described, a housing including two side by side open ended compartments, thermo-actuated means disposed in one of said compartments, and damper means for regulating the openings into said compartments.

9. The combination with a system of the class described having means for controlling the flow of a fluid heat transfer medium, of a room temperature regulator for controlling said system in accordance with the resistance of a wall of the room to exterior temperature changes, said regulator including means forming an open ended compartment extending along and in slightly spaced relation to the room wall and through which compartment air currents affected by the heat transfer medium and the room wall are adapted to pass in opposite directions, means controlling the open ends of the compartment for regulating the admittance of the air currents, and a thermo-responsive element disposed within the compartment and being in controlling connection with the means controlling the flow of the fluid heat transfer medium.

10. The combination with a heating system for rooms and having means for controlling the flow of a fluid heating medium, of a room temperature regulator for controlling said system in accordance with the resistance of a wall of the room to exterior temperature changes and wind conditions, said regulator including means arranged in cooperative relation with the room wall for proportioning a predetermined amount of air thermally affected by the wall which is caused to flow downward therealong in the event of a drop in exterior temperature, and a predetermined amount of air affected by the system and flowing upward along and away from the wall, and thermo-actuated means arranged in cooperative relation with the air proportioning means so as to respond to the mean temperature of the air affected by the system and the wall as proportioned by said means, said thermo-actuated means being in controlling connection with the means controlling the flow of the fluid heating medium.

11. The combination with a heating system for rooms and having means for controlling the flow of a fluid heating medium, of a room temperature regulator for controlling said system in accordance with the resistance of a wall of the room to exterior temperature changes, said regulator including means forming an open ended compartment extending along and in slightly spaced relation to the room wall, means controlling the open ends of the compartment for regulating the admittance of air therethrough, and a thermo-responsive element disposed within the compartment and being in controlling connection with the means controlling the flow of the fluid heating medium, whereby in the event of a drop in exterior temperature said element responds to a predetermined mean temperature between that of two air currents caused to flow through the compartment in opposite directions, one of which is thermally affected by the wall in accordance with its resistance to exterior temperature and the other of which is thermally affected by the heating system.

JOHN C. HORNUNG.

CERTIFICATE OF CORRECTION.

Patent No. 1,919,330.                              July 25, 1933.

JOHN C. HORNUNG.

It is hereby certified that error appears in the printed specification of the above numbered patent requiring correction as follows: Page 2, line 112, strike out the words "held under tension by and secured" and insert instead ""end of a rocker arm 50 which is"; page 3, line 13, after "service" insert "switch"; and that the said Letters Patent should be read with these corrections therein that the same may conform to the record of the case in the Patent Office.

Signed and sealed this 22nd day of August, A. D. 1933.

(Seal)                                  M. J. Moore.
                                       Acting Commissioner of Patents.